(12) United States Patent
Yu et al.

(10) Patent No.: US 9,396,868 B2
(45) Date of Patent: Jul. 19, 2016

(54) SIGNAL COUPLING APPARATUS FOR POWER LINE COMMUNICATION

(71) Applicant: LSIS CO., LTD., Anyang-si, Gyeonggi-do (KR)

(72) Inventors: Young Gyu Yu, Seoul (KR); Jae Kang Sim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 344 days.

(21) Appl. No.: 13/889,287

(22) Filed: May 7, 2013

(65) Prior Publication Data
US 2013/0300208 A1 Nov. 14, 2013

(30) Foreign Application Priority Data

May 14, 2012 (KR) .......................... 10-2012-0050892

(51) Int. Cl.
*H01F 38/14* (2006.01)
*H04B 3/56* (2006.01)

(52) U.S. Cl.
CPC ................. *H01F 38/14* (2013.01); *H04B 3/56* (2013.01); *H04B 2203/5487* (2013.01)

(58) Field of Classification Search
CPC ........................................................ H04B 3/56
USPC .................................. 307/3; 340/12.38, 12.39
See application file for complete search history.

(56) References Cited

U.S. PATENT DOCUMENTS

| 5,537,087 | A | * | 7/1996 | Naito ............................... 336/92 |
| 7,170,367 | B2 | * | 1/2007 | Cern .......................... 340/12.38 |
| 7,245,201 | B1 | | 7/2007 | Kline et al. |
| 7,859,378 | B2 | * | 12/2010 | Merck et al. .................... 336/90 |
| 2002/0110310 | A1 | * | 8/2002 | Kline ............................... 385/15 |
| 2003/0234713 | A1 | | 12/2003 | Pridmore, Jr. et al. |
| 2007/0176723 | A1 | * | 8/2007 | Renz et al. .................... 336/210 |

FOREIGN PATENT DOCUMENTS

EP 1895673 3/2008

OTHER PUBLICATIONS

European Patent Office Application Serial No. 13167056.4, Search Report dated Jun. 28, 2013, 6 pages.
Korean Intellectual Property Office Application Serial No. 10-2012-0050892, Office Action dated Mar. 21, 2013, 3 pages.

* cited by examiner

*Primary Examiner* — Fritz M Fleming
(74) *Attorney, Agent, or Firm* — Lee, Hong, Degerman, Kang & Waimey; Jonathan Kang; Richard Salfelder

(57) ABSTRACT

Disclosed is a signal coupling apparatus for power line communication, the apparatus comprising a housing centrally formed with a groove to pass a power line there through, and a non-contact interface unit accommodated inside the housing to induce a power signal or a power line communication signal from the power line using an electromagnetic induction.

7 Claims, 3 Drawing Sheets

SIGNAL COUPLING APPARATUS FOR POWER LINE COMMUNICATION

CROSS REFERENCE TO RELATED APPLICATION

Pursuant to 35 U.S.C. §119 (a), this application claims the benefit of earlier filing date and right of priority to Korean Patent Application No. 10-2012-0050892, filed on May 14, 2012, the contents of which are hereby incorporated by reference in their entirety.

BACKGROUND OF THE INVENTION

1. Field of the invention

Exemplary embodiments of the present disclosure relate to a signal coupling apparatus for power line communication.

2. Description of Related Art

Generally, a PLC (Power Line Communication) is a method based on a communication signal superimposed on a carrier wave transmitted via a high voltage distribution line or a low voltage distribution line installed outdoors or indoors, to thereby transmit a voice signal and/or a data signal at a high speed.

A power line, as a network installed to supply electricity to homes and offices, has been to the fore as the most ideal subscriber network in terms of wide (90% or more) distribution rate and excellent maintainability and repairability, albeit being inadequate as a communication network due to complicated construction and poor line characteristics.

Particularly, the power lines can save huge investment costs in view of the fact that no new communication networks for communication are needed as existing electric outlets or receptacles installed at each place can be used as communication terminals. In other words, existing power lines that already have been run to many homes and offices can be used to carry data signals to and from the homes and offices. The PLC is configured such that a PLC signal (9 kHz to 30 MHz) is transmitted on a commercial AC (50 Hz or 60 Hz) flowing on a power line, and the transmitted signal is separated by a frequency filter for use at a reception side.

FIG. 1 is an exemplary schematic view illustrating a remote meter-reading system mounted with a repeater embedded with a PLC modem.

A wattmeter (10, 20, 30) at each consumer may be installed with a PLC, and a concentrator (50) performs a power line communication with each consumer (10, 20, 30) via a power line (L). The concentrator (50) receives tele-metering information from each consumer (10, 20, 30) and provides the information to a power provider server via a data communication network. In the remote meter-reading system thus described, a repeater (40) may be installed on an electric pole if necessary, where an interface device is required for coupling a signal on the power line (L) to the repeater.

A conventional interface device for coupling the power line signal is generally configured by a copper wire inside a power line coating being electrically connected to a predetermined screw pin. The conventional interface device suffers from disadvantages in that work efficiency deteriorates according to a worker, a power line can be damaged by a force applied by a worker for turning a screw pin and work risk increases because a high voltage power line are directly connected to the screw pin. Another disadvantage is that moisture and foreign objects may be introduced into the coating of the power line through the screw pin to decrease the communication performance.

SUMMARY OF THE INVENTION

Exemplary aspects of the present disclosure are to substantially solve at least the above problems and/or disadvantages and to provide at least the advantages as mentioned below. Thus, the present disclosure is directed to provide a signal coupling apparatus for power line communication configured to couple, in a non-contact way, a power signal flowing in a power line to a power line communication signal using an electromagnetic induction.

In one general aspect of the present invention, there is provided a signal coupling apparatus for power line communication, the apparatus comprising: a housing centrally formed with a groove to pass a power line therethrough; and a non-contact interface unit accommodated inside the housing to induce a power signal or a power line communication signal from the power line using an electromagnetic induction.

In some exemplary embodiments, the non-contact interface unit may comprise a first current transformer configured to induce the power signal as a signal on a secondary side; and a second current transformer configured to induce the power line communication signal as a signal on the secondary side.

In some exemplary embodiments, each of the first and second current transformers may include a current transformer having an electric wire wound on a core.

In some exemplary embodiments, each of the first and second current transformers may take a cylindrical hole formed at a center of the core to wrap a periphery of the power line.

In some exemplary embodiments, each of the first and second current transformers may be accommodated into a divided inner space of the housing by allowing each core wound with an electric wire to be molded.

In some exemplary embodiments, each of the first and second current transformers may take a cylindrical hole formed at a center of the core to wrap a periphery of the power line.

In some exemplary embodiments, each of the first and second current transformers may take a shape of a clamp by the core divided to a lengthwise direction.

In some exemplary embodiments, the housing may be divided to a lengthwise direction to be opened and closed, and takes a cylindrical shape.

In some exemplary embodiments, the housing may comprise: an upper bracket; and a bottom bracket connected at one side to the upper bracket via a hinge for opening and closing.

In some exemplary embodiments, each of the upper and bottom brackets substantially may have a same structure.

In some exemplary embodiments, the housing formed with the groove may be formed with an elastic member.

In an advantageous effect, the signal coupling apparatus for power line communication according to the exemplary embodiment of the present disclosure includes a current transformer for inducing a power signal flowing in a power line and a current transformer for coupling a power line communication signal to enable the power signal and the power line communication signal to be coupled by a non-contact way according to an electromagnetic induction, whereby efficiency and stability for installation of signal connection device can be enhanced and quality of power line communication can be improved.

DETAILED DESCRIPTION OF THE INVENTION

The exemplary embodiment of the present disclosure now will be described more fully hereinafter. The present disclosure may, however, be embodied in many different forms and should not be construed as limited to the specific embodiments set forth herein. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Now, exemplary embodiments of the present disclosure will be explained in detail together with the figures.

Figure 1:
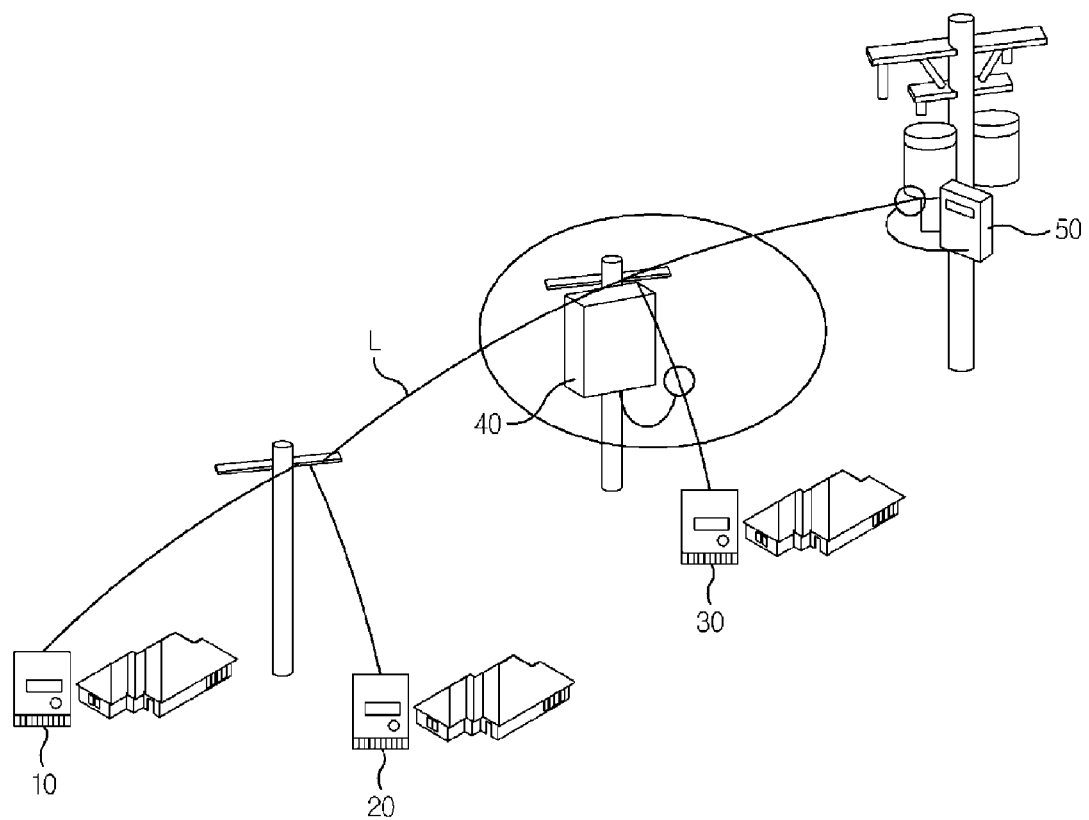
FIG. 1 is an exemplary schematic view illustrating a remote meter-reading system mounted with a repeater embedded with a PLC modem.
Figure 2:
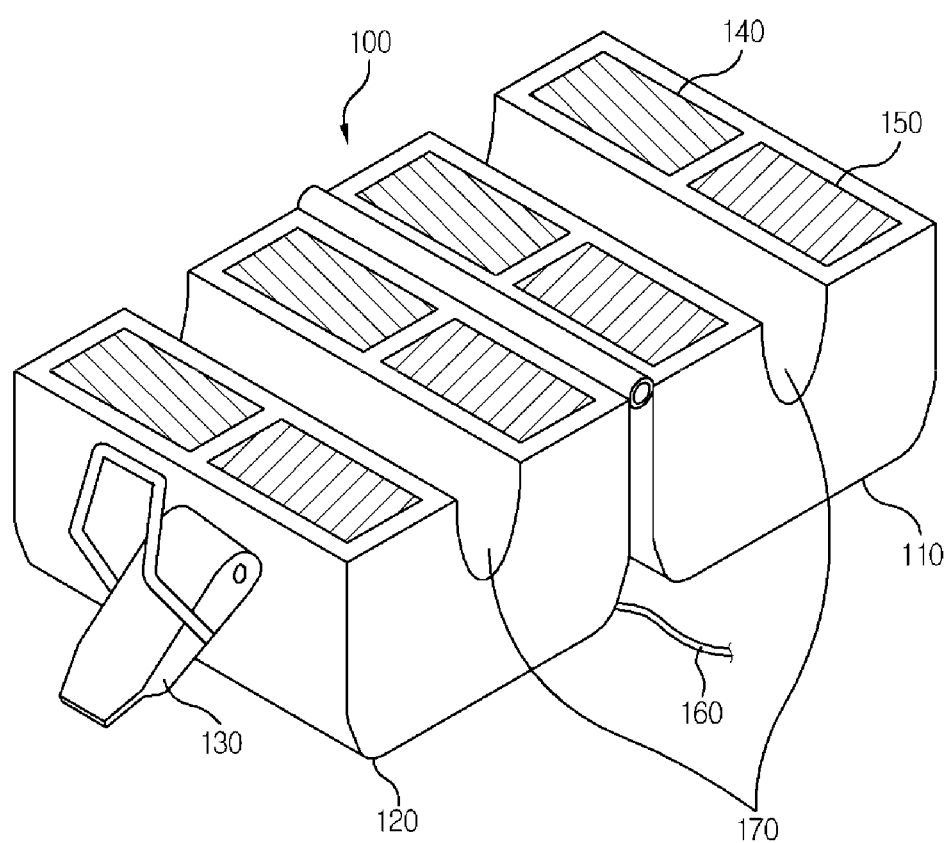
FIG. 2 is an exemplary schematic view illustrating a signal coupling apparatus for power line communication according to an exemplary embodiment of the present disclosure.

FIG. 2 is an exemplary schematic view illustrating a signal coupling apparatus for power line communication according to an exemplary embodiment of the present disclosure.

The signal coupling apparatus for power line communication according to an exemplary embodiment of the present disclosure comprises a cylindrical housing centrally formed with a groove to pass a power line therethrough, and a non-contact interface unit accommodated inside the housing to induce a predetermined signal from the power line passing through the housing according to an electromagnetic induction.

Referring to FIG. 2 again, the signal coupling apparatus for power line communication according to an exemplary embodiment of the present disclosure will be described in more detail. The signal coupling apparatus for power line communication according to an exemplary embodiment of the present disclosure includes the housing including an upper bracket (110), a bottom bracket (120) and an opening/closing latch (130), the interface device including a first current transformer (140) and a second current transformer (150), and a lead wire (leader line, 160) outputting a predetermined signal induced by the interface device.

Referring to FIG. 2 again, the housing is openable and closeable by being divided to the upper bracket (110) and the bottom bracket (120) to a lengthwise direction, each bracket being connected at one side via a hinge, whereby the power line can be easily led into and led out of the housing without being damaged. Each of the upper and bottom brackets (110, 120) is formed with a groove (170) and substantially has a same structure. The housing formed with the grooves (170) through which the power line is led into and led out, and which are formed on the upper and bottom brackets (110, 120) may be formed with an elastic material such as a rubber, and can accommodate an electric wire of various thicknesses.

The opening/closing latch (130) is configured to close and lock-up the upper and bottom brackets (110, 120), and serves to allow the upper bracket (110) to be tightly brought into contact with the bottom bracket (110), and to minimize the movement of the power line introduced into the housing, whereby efficiency of signal induction through the first and second current transformers (140, 150) of the interface unit can be enhanced.

The first and second current transformers (140, 150) of the interface unit may be a current transformer wound with an electric wire on a core, where the core wound with the electric wire may be molded and accommodated into the housing by dividing the housing, i.e., an inner space of the upper bracket (110) and the bottom bracket (120).

As noted above, because the housing is openable and closeable by being divided to the upper bracket (110) and the bottom bracket (120) to a lengthwise direction to allow the power line to be easily led into and led out of the housing, the first and second current transformers (140, 150) accommodated inside the inner space of the upper bracket (110) and the bottom bracket (120) may take a clamp shape by the core divided to a lengthwise direction, and a center of the core is preferably formed with a cylindrical hole to wrap a periphery of the power line.

In a case the power line is led into the center of the upper bracket (110) and the bottom bracket (120), and the upper bracket (110) and the bottom bracket (120) are closed and locked-up by the opening/closing latch (130), the divided cores accommodated into the upper bracket (110) and the bottom bracket (120) are tightly brought into contact to allow a magnetic flux to flow through an entire area of the cores.

Meantime, the power line is present with an AC (Alternating Current) commercial power and a power line communication signal, and the signal coupling apparatus for power line communication according to an exemplary embodiment of the present disclosure may be formed with a first current transformer (140) and a second current transformer (150), as non-contact power interface units, in order to induce a power signal at a secondary side and a power line communication signal at a secondary side from the AC (Alternating Current) commercial power and power line communication signal.

That is, the first current transformer (140) is a signal at the secondary side to induce a power signal at the secondary side from the power line. A core of the first current transformer (140) is preferably formed with non-oriented silicon steels excellent in saturation characteristic in high current, and minimizes a loss such as an eddy current by stacking the silicon steels.

The second current transformer (150) is a signal at the secondary side to induce a power line communication signal at the secondary side from the power line. That is, the power line communication signal flowing in the power line can be coupled using the current transformer to obtain the power line communication signal at the secondary side, which is a signal at the secondary side of the second current transformer (150). The power line communication signal at the secondary side has a frequency band of 9 kHz-30 kHz, such that the core of the second current transformer (150) is preferably formed with a nano-crystalline material smaller in attenuation in a frequency band of the power line communication. Furthermore, a method of reducing a magnetic flux per unit area may be applied as a method for controlling a magnetic flux density by adjusting a unit area and an air gap lest the second current transformer (150) should be saturated at the high current.

The lead wire (leader line, 160) serves to transmit the signal at the secondary side of the first current transformer (140) and the second current transformer (150), i.e., the power signal at the secondary side and the power line communication signal at the secondary side, to the other power line communication devices such as a repeater.

As apparent from the foregoing, the signal coupling apparatus for power line communication according to an exemplary embodiment of the present disclosure is advantageous in that deteriorated performance of power line communication can be prevented, because a non-contact type signal coupling is performed by using the electromagnetic induction, and an openable and closeable housing is provided to enable a power line to be pulled in and pulled out without damages to the power line such as cutting and removal of coating.

Now, a signal coupling apparatus for power line communication according to an exemplary embodiment of the present disclosure that can be applied to a power line communication system will be described with reference to FIG. 3.

Figure 3:
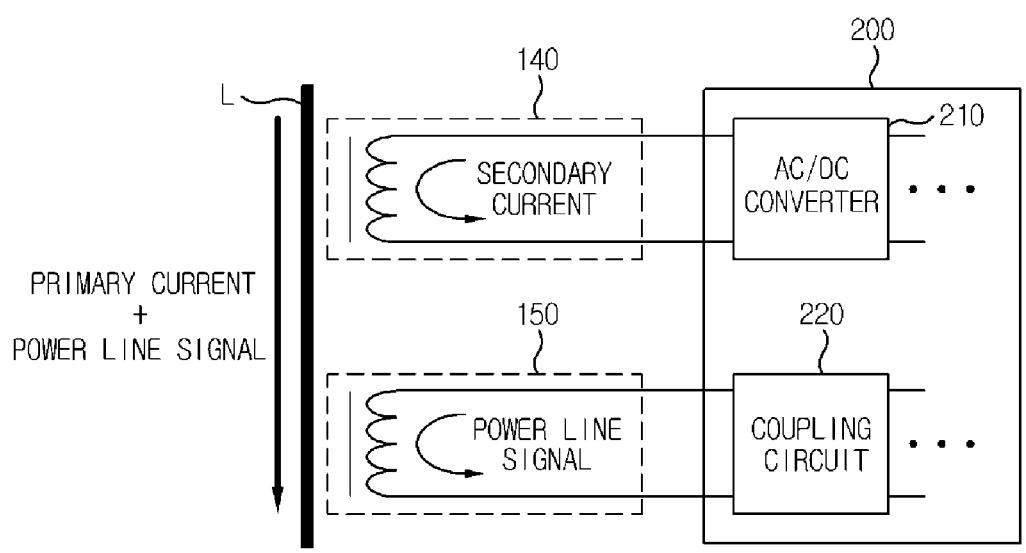
FIG. 3 is a circuit diagram explaining a signal coupling apparatus for power line communication according to an exemplary embodiment of the present disclosure.

FIG. 3 is a circuit diagram explaining a signal coupling apparatus for power line communication according to an exemplary embodiment of the present disclosure.

Referring to FIG. 3, a signal flowing in a power line (L) may be transmitted to a repeater (200) embedded in a power line communication modem via the signal coupling apparatus for power line communication according to an exemplary embodiment of the present disclosure, where the power line (L) is present with an AC commercial power source and a power line communication signal of harmonic band.

A secondary current may be induced from a primary current of the AC commercial power source by the first current transformer (140). The secondary current defines a power signal at the secondary side induced by the first current transformer (140). The power signal is transmitted to the repeater (200) via the lead wire (160). To be more specific, the power signal may be transmitted to an AC/DC converter (210) mounted on the repeater (200), converted to a DC power source by the AC/DC converter (210) and provided as a driving power source of the repeater (200).

Meanwhile, a power line communication signal is induced from the power line communication signal by the second current transformer (150). The power line communication signal at the secondary side is transmitted to a coupling circuit (220) of the repeater (200) via the lead wire (160). The coupling circuit (220) transmits the power line communication signal at the secondary side inputted from the second current transformer (150) to a power line communication modem (not shown), and electrically insulates the second current transformer (150) from the power line communication modem to prevent noise of the power line communication signal at the secondary side from being transmitted to the power line communication modem.

As apparent from the abovementioned explanation and description, the signal coupling apparatus for power line communication according to an exemplary embodiment of the present disclosure is advantageous in that an electromagnetic induction is applied to enable the coupling of a signal flowing in the power line via non-contact way, and a current transformer for inducing a power signal and a current transformer for coupling a power line communication signal are respectively mounted to enable the power signal and the power line communication signal to be transmitted to a power line communication system such as a repeater.

The above-mentioned signal coupling apparatus for power line communication according to an exemplary embodiment of the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A signal coupling apparatus for power line communication, the apparatus comprising:
    a housing centrally formed with a groove to pass a power line therethrough and formed with an elastic member; and
    a non-contact interface unit accommodated inside the housing to induce a power signal or a power line communication signal from the power line using an electromagnetic induction,
    wherein the non-contact interface unit comprises a first current transformer and a second current transformer, each of which having a core wound with an electric wire,
    wherein the core wound with the electric wire is molded and accommodated into the housing by dividing an internal space of the housing and a cylindrical hole is formed at a center of the core to warp a periphery of the power line
    wherein the first current transformer induces the power signal as a signal on a secondary side and is formed with a non-oriented first material excellent in saturation characteristic in high current, and
    wherein the second current transformer induces the power line communication signal as a signal on the secondary side and is formed with a second material smaller in attenuation in a frequency band different from that of the first material.

2. The apparatus of claim 1, wherein each of the first and second current transformers takes a shape of a clamp by the core divided to a lengthwise direction.

3. The apparatus of claim 1, wherein the housing is divided to a lengthwise direction to be opened and closed, and takes a cylindrical shape.

4. The apparatus of claim 1, wherein the housing comprises:
    an upper bracket; and
    a bottom bracket connected at one side to the upper bracket via a hinge for opening and closing.

5. The apparatus of claim 4, wherein each of the upper and bottom brackets substantially has a same structure.

6. The apparatus of claim 1, wherein the first material forming the core of the first current transformer is formed by stacking silicon steels.

7. The apparatus of claim 1, wherein the second material forming the core of the second current transformer is formed with a nano-crystalline material and reduces a magnetic flux per unit area by controlling a magnetic flux density by adjusting a unit area and an air gap.

* * * * *